Figure 1:
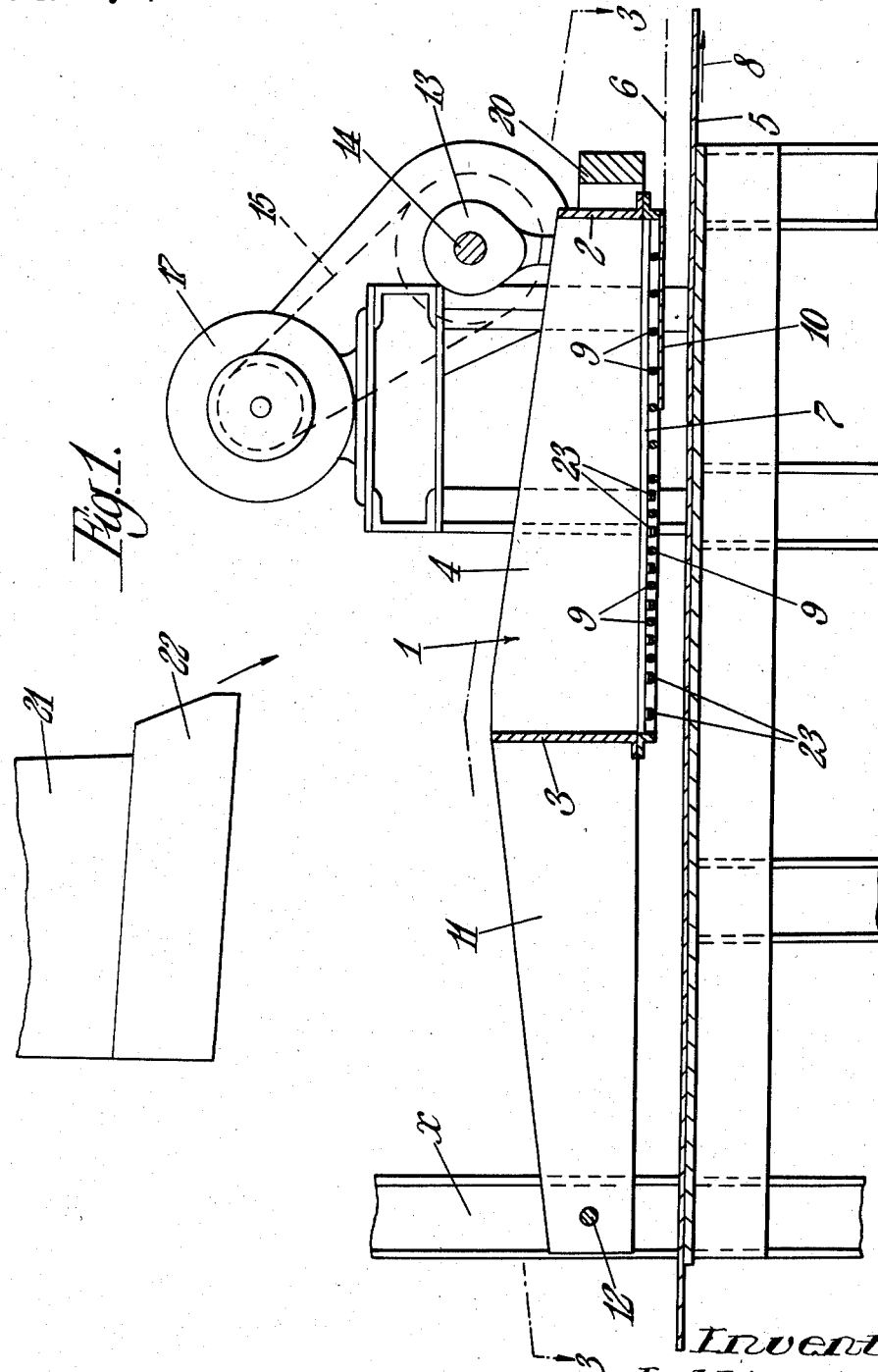

July 28, 1959 L. MITLIN ET AL 2,896,673
FORMING A MAT OR LAYER OF DISCRETE MATERIAL
Filed May 6, 1957 5 Sheets-Sheet 1

Inventors
L. Mitlin
J.A.A. Kay

July 28, 1959 L. MITLIN ET AL 2,896,673
FORMING A MAT OR LAYER OF DISCRETE MATERIAL
Filed May 6, 1957 5 Sheets-Sheet 3

Inventors
L. Mitlin
J. A. A. Kay
By Glascock Downing Seebold
Attys

July 28, 1959 L. MITLIN ET AL 2,896,673
FORMING A MAT OR LAYER OF DISCRETE MATERIAL
Filed May 6, 1957 5 Sheets-Sheet 4
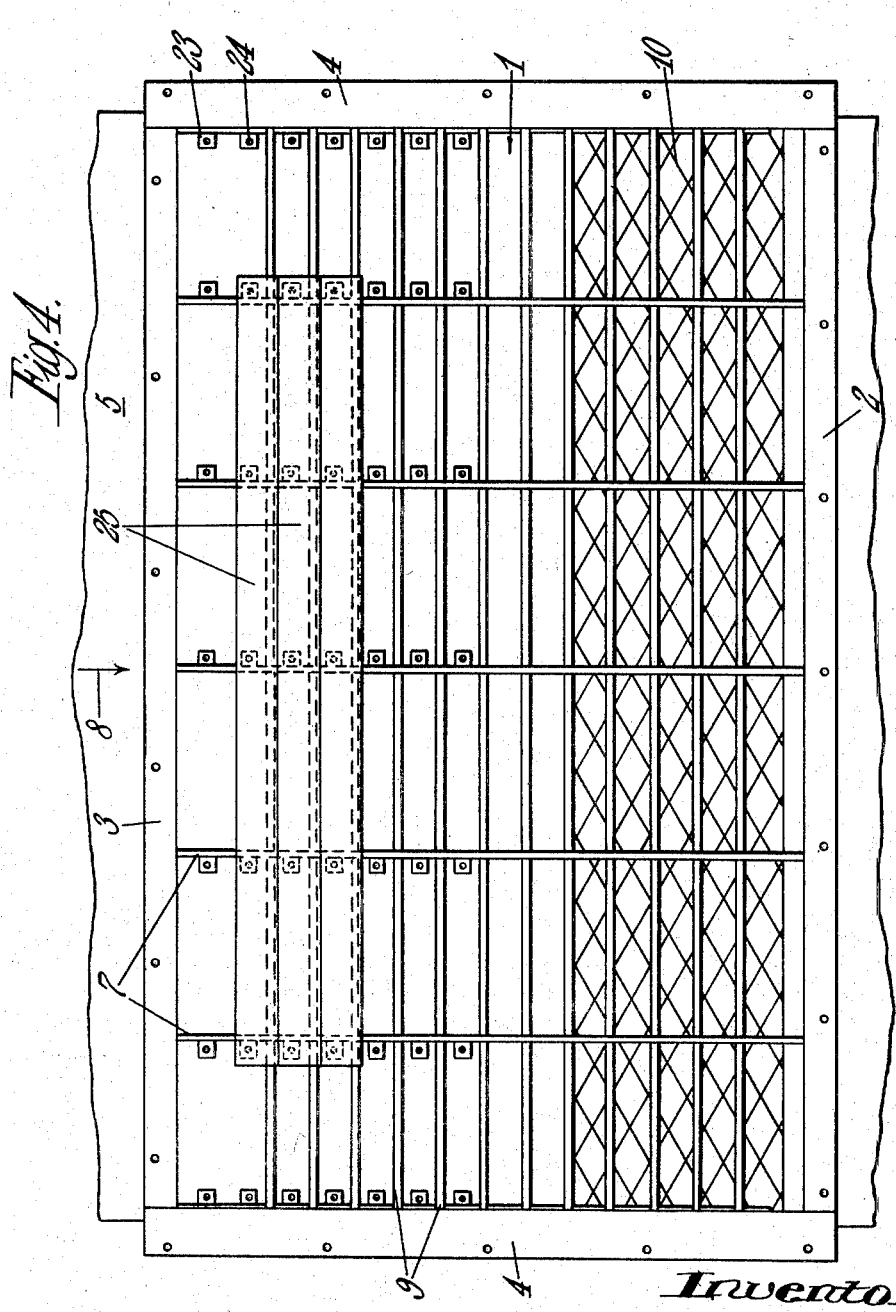
Inventors
L. Mitlin
J. A. A. Kay
By Hascock Downing Seebold
Attys

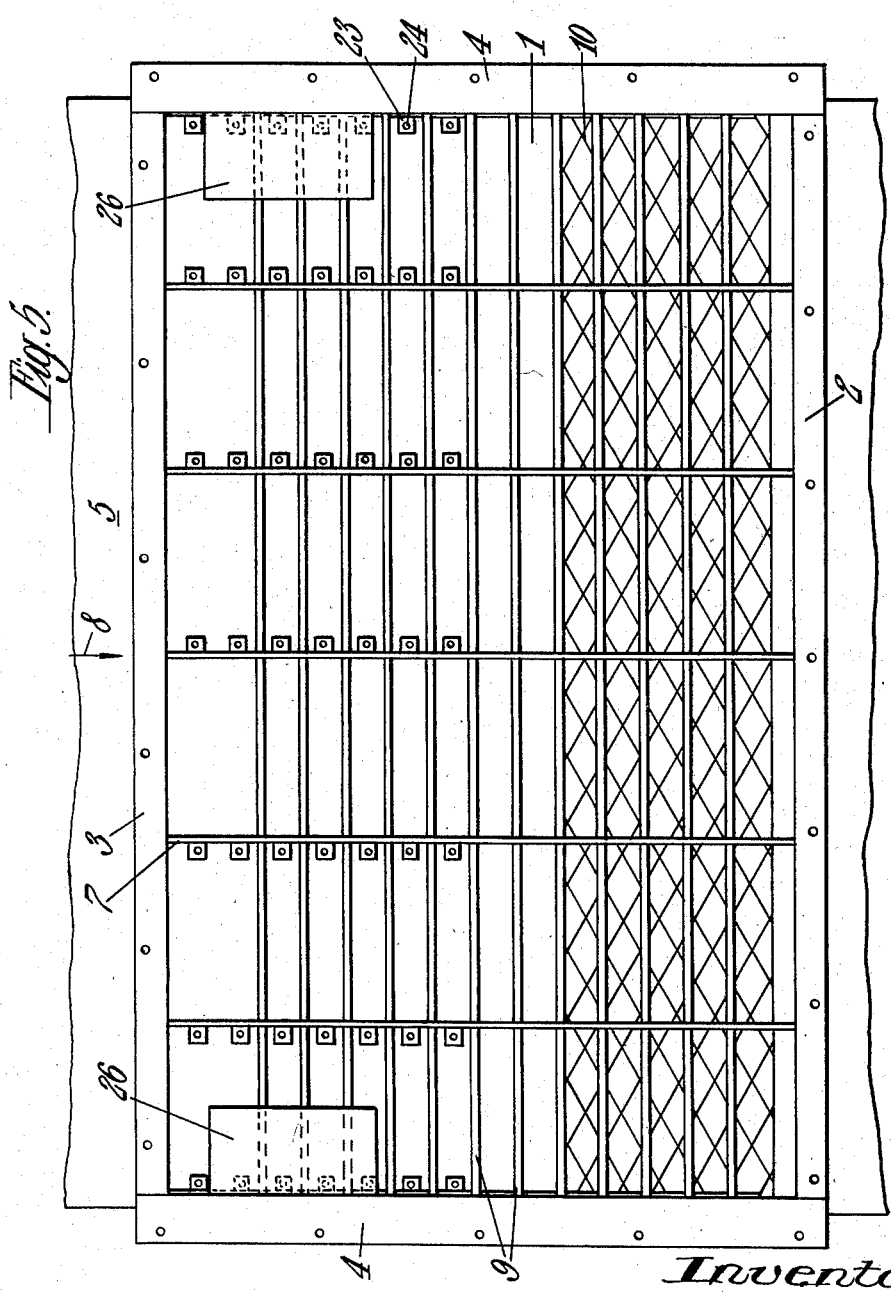

United States Patent Office 2,896,673
Patented July 28, 1959

2,896,673

FORMING A MAT OR LAYER OF DISCRETE MATERIAL

Leonid Mitlin and John Anderson Adams Kay, London, England, assignors to British Artificial Resin Company Limited, London, England Application May 6, 1957, Serial No. 657,308

Claims priority, application Great Britain May 8, 1956

9 Claims. (Cl. 141—1)

This invention relates to apparatus for laying a mat or carpet of discrete material, such as wood chips, on a travelling band or like conveyor prior to the mat or carpet being compressed in a press. In the production of boarding or panels from wood chips or the like (together with a thermosetting binder) in a continuous press it is highly desirable that the mat or carpet of wood chips introduced into the press is of uniform density and thickness across its entire width up to and including the margins.

Apparatus has been previously described in prior British Patent No. 704,346 for laying a mat or carpet of discrete material onto a supporting surface by means of a vibratory tray having a reticulated bottom, the mesh of which is of sufficient size to pass all the material particles, supported above the surface at a distance equal to the thickness of mat required, the underside of the tray serving to strickle the top surface of the laid mat or carpet as a relative displacement is effected between the mat or carpet and the tray. The basic principles on which this last apparatus works has been found to be thoroughly sound and effective, but in order to obtain proper control of density uniformity across the width of the carpet certain modifications and improvements have been made and are the subject of the present invention.

It was found that the apparatus according to British Patent No. 704,346 was capable of laying a mat of material more quickly if the reticulate material of the bottom was reduced in extent to a band extending rearwardly from the front of the tray up to say about half-way, the remainder of the tray bottom being filled in with spaced rods or bars lying parallel to the direction of extent of the mat or carpet. Such an arrangement, however, tended to impair the uniformity of the density of the mat across its width in that the margins of the mat were attenuated due to the rate of material delivery through the tray falling off away from the central portion thereof.

In a further modification of the mat laying tray according to British Patent No. 704,346 and according to the preceding paragraph, the tray bottom was cambered so as to be downwardly convex in cross section whereby there was a greater clearance above the supporting surface (e.g. the band) along the margin than at the center. This in part solved the problem of obtaining uniform density across the mat width but alone was not altogether satisfactory and in certain cases, i.e. when laying very thin mats, (e.g. less than 2 inches thick) there was too great a marginal build-up of material resulting in over-densification of the margins of the mat.

According to the present invention that portion of the bottom of the mat laying tray which is not covered by the reticulated material is blanked off over an area or areas of predetermined size and location so as to inhibit the delivery of the material through the tray bottom over those areas whereby control of the density of the laid mat across its width is obtained.

In the case of a mat-laying tray in which the bottom is not cambered as mentioned above, the blanked-off area is centrally disposed, leaving the marginal portions clear, and its extent in a direction fore-and-aft of the tray increases as the thickness of mat to be laid increases.

In the case of a mat-laying tray the bottom of which is cambered as mentioned above and which is to be used for laying relatively thin mats (e.g. 2 inches thick or less), blanked-off areas are provided at each margin of the tray bottom, leaving the central portion clear, alternatively if thick mats are to be laid, portions in the center are blanked off.

According to one convenient embodiment of the invention, by way of example, the blanked-off areas may be provided by securing sheet material to the tray bottom, the dimensions and location thereof being predetermined by the result desired. The sheet material may be in unit size strips or plates securable to the rod or bar structure of the tray bottom by means of brackets carried by the rods or bars or by longitudinal bearers carrying the rods or bars.

Figure 2:
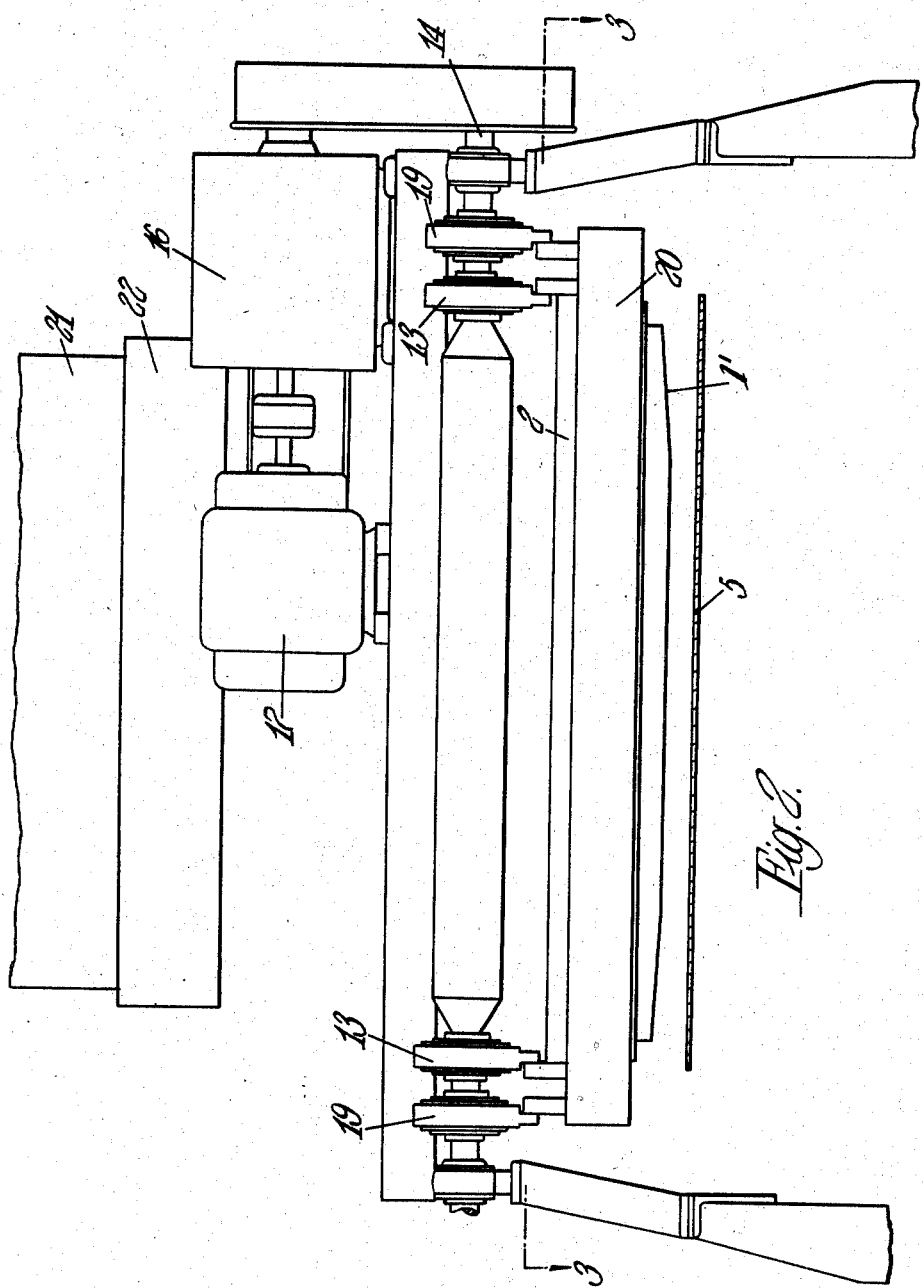
Figure 3:
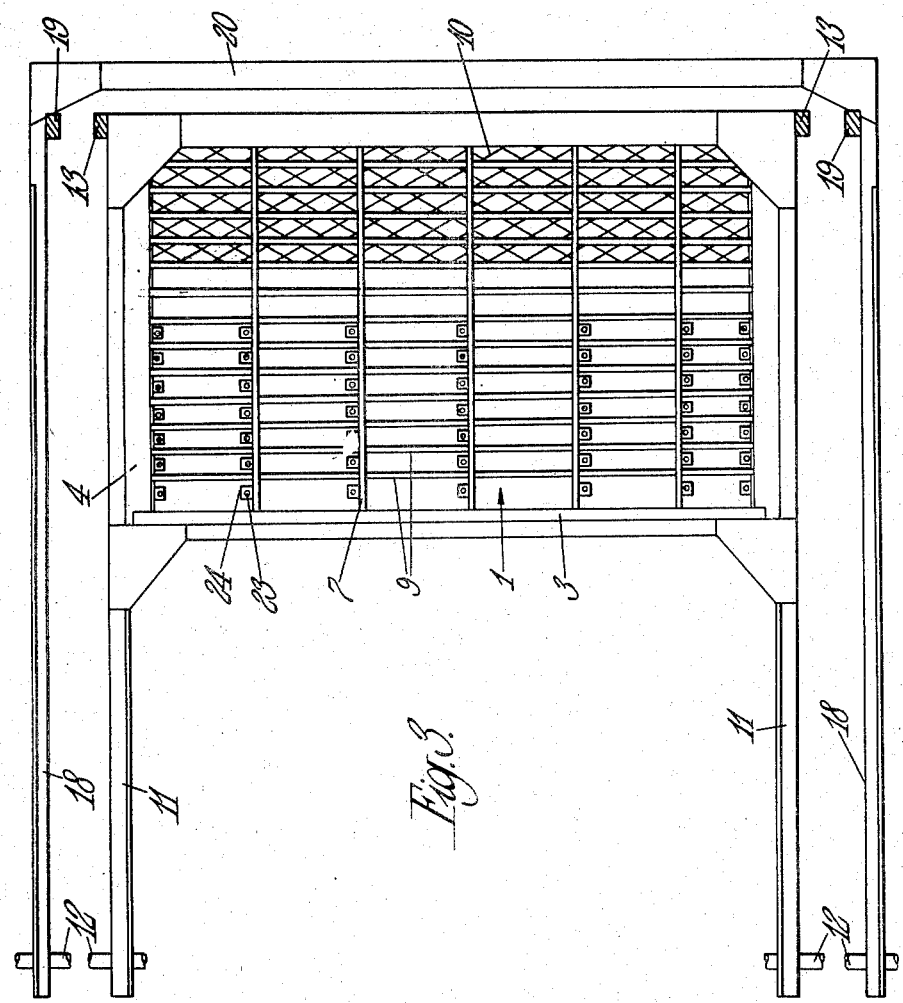

In the accompanying drawings:

Figure 1 is a sectional side elevation of apparatus for laying a mat or carpet of discrete material on a travelling band, and to which the present invention is applicable, Figure 2 is a front elevation of the apparatus shown in Figure 1, Figure 3 is a sectional plan view of the apparatus shown in Figures 1 and 2 taken on the line 3—3 of those figures, and Figures 4 and 5 are more detailed plan views of the tray portion of the apparatus shown in Figures 1 to 3 showing two embodiments of means for controlling the flow of discrete material through the tray bottom, according to the present invention.

In carrying the invention into effect according to one mode by way of example, the apparatus for laying a mat or carpet of discrete material, such as wood chips on a travelling band is generally as described and illustrated in British Patent No. 704,346. Thus a rectangular tray 1 having front and rear walls 2 and 3 and spaced side walls 4 is mounted over a travelling endless band 5. The depth of the carpet to be laid is gauged by the height of the undersurface of the tray above the band 5 in which carries the laid mat or carpet, the level of which is indicated by chain dotted line 6, forward to the next treatment station not shown, but which may be a pre-heating station followed by a compacting press such as, for example, the caterpillar press shown in British Patent No. 665,276. The tray 1 has a skeleton bottom made up of spaced, rectangular-section rods 7 running parallel with the direction of travel of the band 5, see arrow 8, and spaced, transverse, ellipsoid-section rods 9 running at right angles to said direction of band travel. The leading zone of the tray bottom is further made up of a strip of reticulated material 10, such as expanded metal, spanning the tray bottom and extending from the leading edge of the tray rearwardly to a line located at a point between about ⅓ to ½ the distance back along the length of the tray (as illustrated the reticulated material 10 extends back about ⅓ of the tray length). The reticulated material 10 is secured on the underside of the rods 7 and 9, that is, on the undersurface of the tray and serves to strickle the top surface of the mat or carpet as described in the above mentioned British Patent No. 704,346. The skeleton bottom 1' of the tray 1 is slightly downwardly convex or cambered as viewed in a section transvere to the band 5 so that there is a slightly greater clearance between the underside of the tray bottom and the band 5 along the margin than over the central zone, see Figure 2.

The tray 1 is carried on a pair of rearwardly extending arms 11 which are pivotally mounted at 12 to the fixed structure of the apparatus indicated at X so that the tray 1 is free to have limited oscillatory motion about the pivotal axis 12. At or adjacent the forward end of the tray 1, the side walls 4 of the tray are hung from eccentrics 13 carried on a common shaft 14 which is rotatably driven through a drive 15 and gear box 16 from a motor 17 conveniently mounted above the tray 1, so that rapid vibratory motion may be imparted to the tray. In order to reduce torque effects to ease the bending moments on the shaft 14 and to balance the moving structure, a counterbalance system is provided comprising a pair of side arms 18 disposed laterally outside the arms 11 and side walls 4 of the tray 1 and at the rear end pivotally mounted on the same axis 12 as the tray arms 11, at or adjacent their forward end, the counterbalance arms 18 are hung from eccentrics 19 carried on the common shaft 14 but set 180° out of phase to the eccentrics 13 carrying the front end of the tray 1. A counterweight crossbar 20 may be provided connecting across the front ends of the counterweight arms 18.

Above the tray 1 and over its rearward end, hopper means 21 and feeder means 22 of any convenient type are provided to feed the material to the tray 1 to maintain an adequate working head within the confines of the tray.

While the reduction of the extent of the reticulated material 10 from covering the entire bottom of the tray, as described in the aforementioned British patent specification No. 704,346 to that described above and illustrated in the accompanying drawings, had the effect of making the apparatus capable of laying a mat or carpet of material more rapidly, it also tended to impair the uniformity of density of the mat or carpet across its width in that the marginal zones of the mat or carpet become attenuated due to the rate of material delivery through the tray bottom falling off away from the central portion of the tray. The provision of a downwardly convex or cambered bottom to the tray, as described above, alleviated this defect in some degree but was not altogether satisfactory particularly when a relatively thin mat or carpet was being laid (e.g. less than 2 inches thick) due to over build-up of the mat or carpet margins with consequent over-densification of the marginal portion of the finished board.

A further solution to this problem has now been found, and, according to the present invention, means are provided for blanking-off an area or areas of the tray bottom, not covered by the reticulated material 10, so as to inhibit locally the delivery of material through the tray bottom. To this end, the side walls 4 and longitudinal bars 7 of the tray bottom have small brackets 23 secured thereon as by welding in the spaces between the transverse rods 9. Each bracket 23 has an aperture 24 in the projecting flange thereof so that, as shown in Figures 4 and 5, sheets or plates 25 or 26 can be bolted thereto to blank-off areas of the tray bottom. In Figure 4, sheets or plates 25 are secured in a centralised location to inhibit the delivery of material to the central zone of the mat or carpet so that the build-up of mat or carpet thickness in this zone does not outstrip the buildup at the margins. This disposition of the sheets or plates 25 is usually for thicker mats or carpets of, say, about 2 inches thickness. In Figure 5, sheets or plates 26 are secured on each side of the tray bottom to inhibit delivery of the material to the marginal zones of the mat or carpet so that the marginal zones are not over densified when relatively thin mats or carpets of, say, less than 2 inches thickness are being laid.

The location and area of the blanking-off plate 25 or 26 are initially predetermined empirically, but by their provision improved control of the uniformity of density of the mat or carpet across its width can be achieved.

We claim:

1. A method of forming a mat of discrete material comprising feeding such material from a source of supply toward a receiving surface, interposing a vibratory tray having a perforate bottom between source and surface, maintaining a head of material on the tray and a deposition of material on the surface extending over a complete transverse extent of the bottom of the tray, imparting relative transverse movement between source and surface while continuously vibrating the tray and during feeding and in dependence upon the thickness of the mat to be laid continuously depositing less material on at least one selected area of the surface than is deposited on the balance of the surface so that over build-up of the mat on such at least one selected area is prevented and the mat has uniform density.

2. A method of forming a mat of discrete material comprising feeding material from a source of supply toward a receiving surface, interposing a vibratory tray having a perforate bottom between the source and the surface at a distance above the surface such as to determine the desired thickness of the mat, imparting relative linear displacement between such tray and surface to deposit material over an area greater than the area of the bottom of the tray, continuously maintaining a head of material on the tray and a deposition of material on the surface extending over a complete transverse extent of the bottom of the tray while simultaneously continuously vibrating the tray so that the undersurface of the tray limits the thickness of the mat and also strickles the top surface thereof, and during feeding and in dependence upon the thickness of the mat to be laid continuously depositing less material on at least one selected area of the relatively moving surface than is deposited on the balance of such surface so that over build-up of the mat on such at least one selected area is prevented and the mat has uniform density.

3. Apparatus for laying a mat of discrete material on a supporting surface comprising a vibratable tray including a frame, a bottom structure secured to the frame and including spaced elements through which material fed to the tray can pass, means supporting the tray so that the under-surface of the bottom is spaced from the supporting surface a distance equal to the desired thickness of the mat to be laid, so that vibration of the tray will strickle the top surface of the mat, and imperforate surface filling means secured to some of said elements and selectively disposed over at least one area of the bottom of the tray, said surface filling means having a number, size and location relative to the bottom of the tray that is dependent upon the thickness of the mat to be laid so that less material is deposited on the surface underlying such surface filling means than on the balance of the surface, whereby over build-up of the mat in the area underlying such surface filling means is prevented and the mat has uniform density.

4. Apparatus as claimed in claim 3 and said imperforate filling means comprising plate means secured to said elements.

5. Apparatus as claimed in claim 3 and a plurality of bracket means secured to the elements, said bracket means being spaced transversely of the bottom and arranged in series extending across the bottom throughout a substantial extent of the bottom so as to facilitate selective securing of the imperforate surface filling means to occupy any selected area in a complete transverse zone of the bottom as desired.

6. Apparatus as claimed in claim 5 and the under-surface of the bottom of the tray being cambered toward the supporting surface so that the opposite lateral margins of the tray are at a greater distance from the surface than the central portion of the tray.

7. Apparatus for laying a mat or carpet of discrete material on a supporting surface comprising a tray including a frame, a bottom for the frame including spaced elements through which material fed to the tray can pass, means mounting the tray so that the under-surface of the bottom of the tray is spaced from the supporting surface a distance corresponding to the desired thickness of the mat to be laid, means for vibrating the tray so that vibration of the tray strickles the top surface of the mat, said tray and surface being supported for relative linear displacement so that the mat that is laid has greater area than the area of the bottom of the tray, reticulated material secured to said elements extending across the bottom of the tray in a transverse zone extending rearwardly from the edge of the tray that is the leading edge with respect to said relative movement between tray and surface and said transverse zone extending rearwardly from such leading edge part way toward the opposite edge of the tray, an imperforate surface filling means selectively secured to said elements in a zone of the bottom that is rearward of said reticulated material, said imperforate surface filling means having a size location and transverse area in dependence upon the thickness of the mat to be laid so that over build-up of the mat on the surface in that area moving relatively beneath such imperforate surface filling means is prevented and the mat has uniform density.

8. Apparatus for laying a mat of discrete material upon a supporting surface comprising a vibratable tray including a bottom frame having spaced elements through which material fed to the tray can pass, a supporting surface for receiving fed material, means for mounting the tray above the supporting surface a distance equal to the desired thickness of the mat to be laid so that vibration of the tray strickles the top surface of the mat, means for imparting relative linear displacement between the tray and the supporting surface so that the laid mat has greater area than the area of the tray, reticulated material secured to the elements of the bottom and arranged to partially cover the same in a transverse zone extending rearwardly from the edge of the tray that is the leading edge with respect to the relative movement between tray and supporting surface, imperforate surface filling means selectively disposed over at least one area of the bottom of the tray, secured to said elements and having a number, size and location in the bottom of the tray in accordance with the thickness of the mat to be laid, so that less material is fed through the tray bottom in the area blanked-off by said surface filling means than is fed through the balance of the tray bottom, whereby over build-up of mat material in such at least one selected area is restrained and the mat has substantially uniform density, and for mats of wood chips having a thickness of over two inches, said imperforate surface filling means being secured to the elements of the tray bottom at a central area of the bottom, rearwardly of the reticulated material and extending over a zone transversely of the tray bottom, with respect to the direction of relative movement between the tray and the supporting surface that is spaced from the side and rear margins of the tray.

9. Apparatus for laying a mat of discrete material upon a supporting surface comprising a vibratable tray including a bottom frame having spaced elements through which material fed to the tray can pass, a supporting surface for receiving fed material, means for mounting the tray above the supporting surface a distance equal to the desired thickness of the mat to be laid so that vibration of the tray strickles the top surface of the mat, means for imparting relative linear displacement between the tray and the supporting surface so that the laid mat has greater area than the area of the tray, reticulated material secured to the elements of the bottom and arranged to partially cover the same in a transverse zone extending rearwardly from the edge of the tray that is the leading edge with respect to the relative movement between tray and supporting surface, imperforate surface filling means selectively disposed over at least one area of the bottom of the tray, secured to said elements and having a number, size and location in the bottom of the tray in accordance with the thickness of the mat to be laid, so that less material is fed through the tray bottom in the area blanked-off by said surface filling means than is fed through the balance of the tray bottom whereby over build-up of mat material in such at least one selected area is restrained and the mat has substantially uniform density, and for mats of wood chips, having thickness of under two inches, said imperforate surface filling means being secured to the elements of the tray bottom at areas along each side margin of the tray bottom rearwardly of the reticulated material.

References Cited in the file of this patent
UNITED STATES PATENTS

| | | |
|---|---|---|
| 2,112,759 | Boyer | Mar. 29, 1938 |
| 2,450,297 | Pearse et al. | Sept. 28, 1948 |
| 2,673,370 | Goss | Mar. 30, 1954 |
| 2,686,143 | Fahrai | Aug. 10, 1954 |
| 2,803,634 | Chayen | Aug. 20, 1957 |